Dec. 15, 1931.  R. STEARNS  1,836,823
MARKING DEVICE FOR VEHICLE RUNWAYS
Filed June 12, 1930
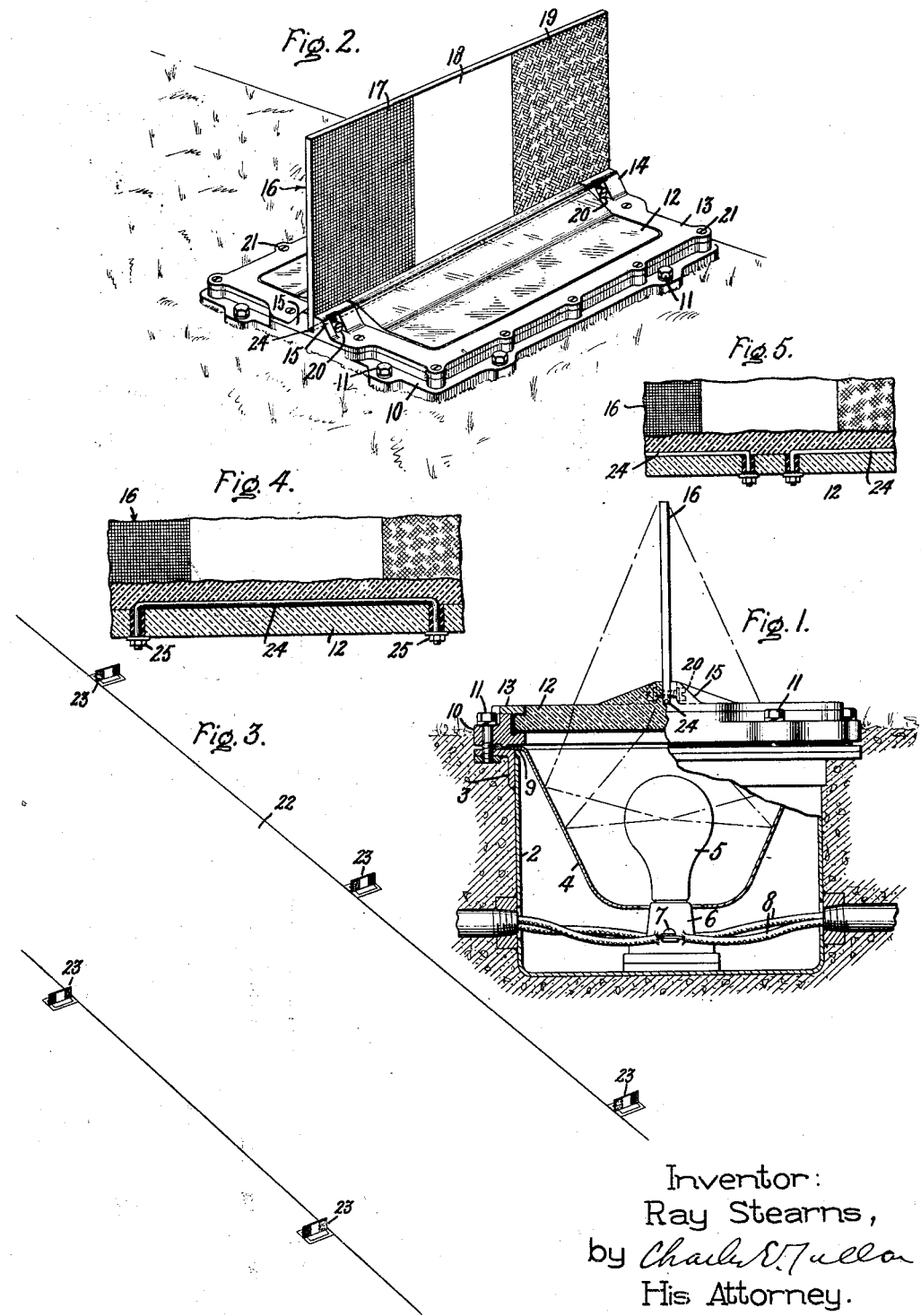
Inventor:
Ray Stearns,
by Charles N. Tullar
His Attorney.

Patented Dec. 15, 1931

1,836,823

UNITED STATES PATENT OFFICE

RAY STEARNS, OF SCHENECTADY, NEW YORK, ASSIGNOR TO GENERAL ELECTRIC COMPANY, A CORPORATION OF NEW YORK

MARKING DEVICE FOR VEHICLE RUNWAYS

Application filed June 12, 1930. Serial No. 460,744.

My invention relates to marking devices and in particular to that type of device adapted to be set along the ground for indicating a boundary or to operate as surface or runway signals, as in aviation fields or along a highway thoroughfare, or in positions exposed to be run over by airplanes or other vehicles. More in particular the invention relates to that type of device in which a marker element is provided, which element is located above the ground and which, if struck or run over by a vehicle, yields readily and as the vehicle passes beyond, rights itself automatically.

My invention relates to an improved marking device and contemplates novel features, combinations and constructions hereinafter set forth and claimed, reference being had to the accompanying drawings.

Referring to the drawings, Fig. 1 is a view partly in cross section and partly in elevation, of a signal device comprising the features of my invention; Fig. 2 shows the device in perspective; Fig. 3 shows several devices of the invention located on both sides of a roadway; Fig. 4 is an enlarged fragmentary view of the device, Fig. 1, showing a modification of the means for securing the marker element to the projector; and Fig. 5 is another modification of the same means.

Referring to Fig. 1, the device comprises a casing 2 provided with a collar 3. Within the casing there is located a reflector 4 and a light source 5 mounted in a socket 6, the latter having terminals (such as the terminal 7) to which conductors 8, connected to any suitable source of current, may be secured. The device is provided with a cover comprising a frame 10. The frame 10 is flanged to receive a glass plate 12 of transparent material, which plate is clamped in place by a collar 13. The rim 9 of the reflector overlaps the collar 3 and is clamped in place by the frame 10 and by suitable clamping means such as bolts 11. The collar 13 has shoulders 14 and 15, one on either side. These shoulders are each slotted to receive the lower edge or heel of the marker element 16. Along the heel of the marker and embedded within the material thereof there is provided a metal rod 24. After the element 16 is in place, as shown in Fig. 2, it may be secured to the shoulders 14 and 15 in any suitable manner, as for example by means of bolts 20, which may extend through or over the rod 24. These bolts may be held in place by nuts or by cotter pins so that the element 16 may be readily removed and a new one substituted without much effort whenever it is necessary.

If desired, the glass plate 12 may be provided with a central ridge having a groove to receive the heel of the element 16, as indicated in Fig. 2. The object of the rod 24 and of the groove is to prevent the central portion of the element from becoming distorted. Also if desired the shoulders 14 and 15 may be omitted and the element 16 may be secured directly to the plate 12, as in Fig. 4, in which case the outer ends of the rod 24 may be bent as indicated in this figure. These ends extend through suitable openings in the glass plate and the rod is secured in place, as for example by nuts 25. The openings in the glass plate through which the ends of the rod extend may be supplied with suitable bushing or gasket means, or both, in order to seal such openings and prevent any water from passing through.

Instead of having a single rod 24, two rods may be used as shown in Fig. 5 each having its ends bent and extending through the glass as shown. In such case the element 16 is secured to the shoulders 14 and 15, as well as to the glass plate.

When the shoulders 14 and 15 are omitted, as above suggested, the width of the element 16 may be restricted to the length of the glass plate, that is, it may be restricted so that it does not overlap the collar 13. The ridge in the glass plate 12 in which the heel of the element 16 is located may be omitted. With the type of construction shown in Fig. 4 the groove may be altogether eliminated. If desired two sets of rods such as shown in Fig. 4 may be provided, the length of each being less than half the length of the element 16, in which case it would be necessary to provide four holes in the plate, two outer holes as shown in Fig. 4 and two inner holes as shown in Fig. 5.

The element 16 is preferably provided with sections 17, 18, and 19 of different colors, as indicated in Fig. 2. The color or colors of each section may be varied, depending upon the background, to obtain the maximum of contrast.

The reflector 4 within the casing 2 is so designed as to project a beam of light upwardly and against the sides of the element 16, thus illuminating the marker and making it visible from any point within a wide range in almost any direction. If desired, however, the reflector 5 may be omitted and a number of lamps used for illuminating the marker by direct rather than by reflected light.

In Fig. 3 I have indicated a roadway 22 along either side of which a number of roadway markers 23, such as shown in Figs. 1 and 2 are located. Obviously, these markers may be seen from any direction of approach so that an airplane, for example, can have no difficulty in locating the position of the roadway in landing. If by any chance, the airplane should run over any one of the markers, no damage can result either to the marker or to the airplane, since that portion of the marker located above the region of support, as for example above the rod 24, yields readily to the vehicle.

The system of marking the runways of an airplane field herein described has the advantage that all glare from any light source is avoided and that an aviator always knows with certainty just where the surface lies, that is, just a few inches at most below the lower edges of the marker elements, or on a line with them. Each of the markers is in the nature of an illuminated spot free from glare, which spot has the same relation to the surface in its proximity that every other spot has. Therefore, if there are any undulations in the surface the aviator can detect them. This method of marking, therefore, is much superior to the usual flood light method which produces a sheet of light, the depth of which the aviator has no means of determining with certainty. He has no way of determining whether there is a depression, a down slope or an up slope below the beam. With the spot method of indication the aviator has also the advantage that he can readily gauge distances and dimensions about the field since the dimensions of the markers and their distances apart may be made standard. These illuminated spots, furthermore, enable the aviator to gauge the angle of descent by their appearance in perspective individually and collectively.

It will be understood that while I have confined my illustration in the drawings to specific forms of construction, I do not wish to be limited to the forms shown, since I contemplate variations and modifications within the scope of the claims contained herein.

What I claim as new and desire to secure by Letters Patent of the United States, is:

1. A roadway marking device comprising a marker element, a frame located along the surface of the ground having a glass plate therein, a light projector located below said plate to project a beam of light therethrough, said marker element being secured to said frame in an upright position and in relation to said projector to be lighted on both sides by the said beam, said marker element being made of resilient material whereby when struck by an advancing vehicle the portion of the marker element located above the region of support thereof by said frame will yield readily and assume a position transverse the said normal position to allow the vehicle to pass over the marker element and the latter thereafter resume its normal upright position.

2. A roadway marking device comprising a marker element, a frame located along the surface of the ground having a glass plate therein, a light projector located below said plate to project a beam of light therethrough, said marker element being secured to said plate in an upright position and in relation to said projector to be lighted on both sides by the said beam, said marker element being made of resilient material whereby when struck by an advancing vehicle the part of the marker element located above the region of support thereof by said plate will yield readily and assume a position transverse the said normal position to allow the vehicle to pass over the marker element and the latter thereafter assume its normal upright position.

3. In combination, a glass plate, a resilient marker element secured thereto in position to project therefrom, and a light projector located behind said plate in position to project a beam of light through said plate to illuminate both sides of said marker element.

4. In combination, a glass plate and a frame therefor, a resilient marker element secured to said frame so as to extend across said plate in a position projecting therefrom, and a light projector located behind said plate in position to project a beam of light through said plate to illuminate said marker element, said marker element consisting of sections of different colors.

5. A roadway marking device comprising in combination, a marker element of resilient material, a projector provided with a casing, a cover for said casing having a plate of light transmitting material located transverse the axis of the projector, said cover comprising a frame for the plate, means for securing said frame to said casing, and means on the frame for securing said marker element in position across said plate with the broad sides thereof extending in a direction transverse the plate, said projector being adapted to project a beam of light through said plate against the broad sides of said element, said casing being adapted to be embedded in the ground with the said cover substantially flush with the ground, and means whereby said element may be removed from and restored to its position on said cover while the casing is in the ground and while the cover is secured to the casing.

6. A roadway marking device comprising in combination, a marker element of resilient material, a projector provided with a casing, a cover for said casing having a plate of light transmitting material located transverse the axis of the projector, said cover comprising a frame for the plate, means for securing said frame to said casing, and means on the frame for securing said marker element in position across said plate with the sides thereof extending in a direction transverse the plate, said projector being adapted to project a beam of light through said plate against the broad sides of said element, said casing being adapted to be embedded in the ground with the said cover substantially flush with the ground, and means whereby said cover and marker may be removed from the casing as a unit.

7. In combination, a casing adapted to be located in the ground, a glass plate forming a cover for the casing, a resilient marker element secured to the glass plate and projecting therefrom, and a light located in the casing for projecting light through the plate to illuminate the marker.

In witness whereof, I have hereunto set my hand this 11th day of June, 1930.

RAY STEARNS.